Figure 1:
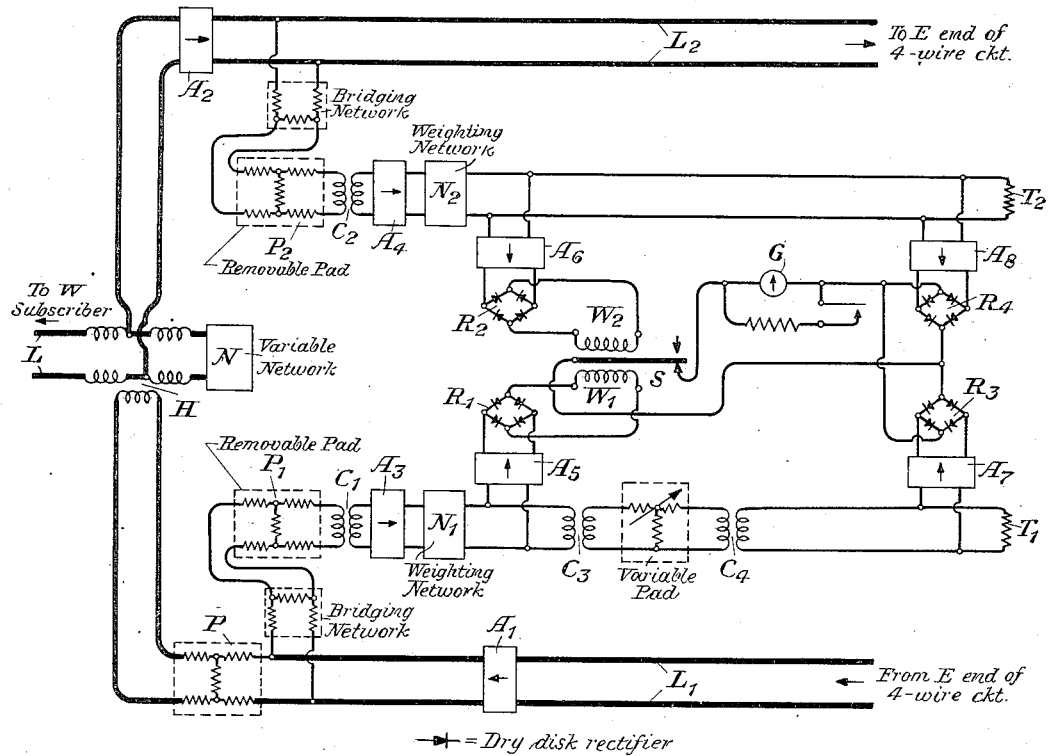

Oct. 15, 1935.  L. G. ABRAHAM ET AL  2,017,175

MEASUREMENT OF RETURN LOSS

Filed June 1, 1934

INVENTORS
L.G.Abraham, D.Mitchell and
BY R.S.Hawkins
ATTORNEY

Patented Oct. 15, 1935

2,017,175

UNITED STATES PATENT OFFICE

2,017,175

MEASUREMENT OF RETURN LOSS

Leonard Gladstone Abraham, Madison, and Doren Mitchell, Bound Brook, N. J., and Russell Shaw Hawkins, Ozone Park, N. Y., assignors to American Telephone and Telegraph Company, a corporation of New York Application June 1, 1934, Serial No. 728,608

16 Claims. (Cl. 179—175.31)

This invention relates to two-way transmission systems and, more particularly, to the points in such a system at which there are what are usually termed "two-wire balances" involving varying "return losses". With greater particularity the invention relates to methods of and means for measuring the "return loss", as defined hereinafter.

As is well understood in the art, a two-wire transmission line such as a telephone line which forms a part of a two-way transmission system, may be connected with two paths adapted for transmission in opposite directions with what may be termed approximately conjugate relationship. These paths adapted for transmission in opposite directions may be the paths of a two-wire repeater or the paths at one end of a four-wire circuit. The connection is made through a hybrid coil or the equivalent, and an artificial network connected to the hybrid coil is provided for the purpose of giving an approximate balance with the impedance of the two-wire line. It is well understood that for practical purposes this balance between the two-wire line and the artificial network is never perfect; in fact, when energy is transmitted over one of the paths to the two-wire line a considerable amount of the energy is reflected back over the path adapted for transmission from the two-wire line. The applicants measure the ratio between the energy delivered to the two-wire line (over one of the oppositely directed one-way paths) and the energy returned from said line (over the other one-way path): when the expression "return loss" is used in this specification it is used in such sense rather than in its strict mathematical sense. This loss—the ratio between the energy delivered to and the energy returned from the two-wire line—is usually practically the same as the "return loss" in the strict sense of the term and is in any case the loss which is of practical importance in producing echo effects. It is recognized, however, that the mathematically determined "return loss" may in some cases differ appreciably from the "return loss" measured and hereinafter referred to by the applicants—that is, the quantity representing the ratio between the energy delivered to the two-wire line and the energy returned therefrom, as discussed hereinabove.

It is also well understood in the art that the energy reflected as described hereinabove presents important problems to the electrical engineer. Therefore, it becomes highly desirable that methods and means be provided whereby an accurate measurement of this quantity can be made.

The present invention, while generally applicable to all points of two-wire balance in a two-way transmission system, is particularly designed to give with an approach to accuracy, a measurement of the return loss involved in the connection between the end of a toll circuit and a two-wire circuit including a toll switching trunk and subscriber's line, in which no appreciable delay is involved. It is pointed out that the greater the delay involved the greater will be the chance of considerable inaccuracy in the measurement.

As indicated hereinabove, it is the primary object of the invention to provide for the satisfactory measurement of return losses, and it is further the object of the invention to permit such measurement to be made satisfactorily during the actual use of the transmission system.

In obtaining the objects stated hereinabove, the applicants, in general, provide for the comparison of the magnitude of the energy in the path transmitting toward the two-wire line and the magnitude of the reflected energy in the oppositely directed path, and for the determination of the return loss from the difference discovered by such a comparison. In addition, provision is made whereby there are prevented false measurements and damage to the apparatus involved as a result of non-reflected energy traveling in the opposite direction. The apparatus involved includes two high impedance branches, one connected to each side of the four-wire circuit, the return loss indicating apparatus described more fully hereinafter, and direction indicating apparatus, whereby the return loss indication is given only when the non-reflected transmission in the opposite direction is not of sufficient value to produce a false indication or damage to the return loss indicating apparatus.

The invention will be clearly understood when the following detailed description is read with reference to the accompanying drawing in which—

Figure 2:
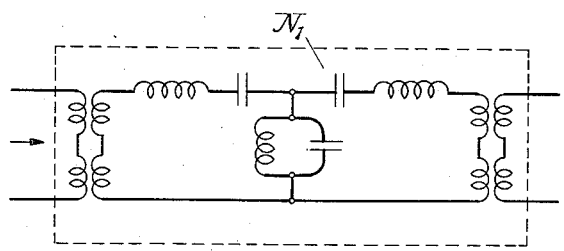

Figure 1 represents diagrammatically, and in part schematically, one desirable arrangement of apparatus in accordance with the invention, and Fig. 2 shows diagrammatically one element, schematically indicated in Fig. 1, in some detail.

With reference to Fig. 1, there is shown what will be termed the west (W) end of a four-wire circuit which may be understood to form a part of a toll telephone circuit. Associated with this end of the four-wire circuit through a hybrid coil H is a two-wire circuit L which may be understood to be a toll switching trunk, comparatively short, leading to the line of a subscriber known as the west or W subscriber. It will be understood that the path $L_1$ of the four-wire circuit with its one-way amplifier $A_1$ is adapted for transmission from the east (E) end of the four-wire circuit to the line L, while the path $L_2$ with its one-way amplifier $A_2$ is adapted for transmission from the line L to the east end of the four-wire circuit. The line L is "balanced" through the hybrid coil H by the variable network N. As indicated hereinabove, the imperfect balance has the result that a part of the energy transmitted over $L_1$ is reflected back over the opposite path $L_2$, with the well known possible consequences such as the false operation of echo suppressor and singing suppressor apparatus. The return loss will be greater or smaller as the impedance of the network N approaches or departs from the impedance of the line L and any circuit connected thereto. The apparatus to be described hereinbelow is designed to give the above indicated satisfactory measurement of this return loss.

A high impedance branch is associated with the output of each of the amplifiers $A_1$ and $A_2$ in the paths $L_1$ and $L_2$, respectively. Each of these branches includes the "bridging network", and leads to a terminal impedance $T_1$ or $T_2$, and to the direction indicating circuit and the return loss indicating circuit. The direction indicating circuit includes amplifiers $A_5$ and $A_6$, rectifiers $R_1$ and $R_2$ and the relay S, while the return loss indicating circuit includes amplifiers $A_7$ and $A_8$, rectifiers $R_3$ and $R_4$ and the galvanometer G. Included in the branch from the incoming line $L_1$ is a variable pad which serves as the direct indicator of the value of the return loss, as will be more fully discussed hereinafter. It is to be understood that the purpose of the direction indicating apparatus is to disable or prevent the operation of the return loss indicating mechanism when there is a substantial amount of energy originating in a circuit connected to line L and traveling in the path $L_2$.

It is believed that the further details of the apparatus shown in Fig. 1 will be best understood from a description of the operation of the applicants' measuring circuit specifically disclosed therein.

If the E subscriber is talking, the returned voice energy in path $L_2$ will be small in comparison with the energy in $L_1$, the difference varying in accordance with the degree of the return loss. By means of the branch circuits and the return loss indicating apparatus, rectified voice currents from each side of the four-wire circuit are impressed on the galvanometer G. If it be assumed that the rectifiers of the return loss indicating circuit, $R_3$ and $R_4$, are matched and are not overloaded, the galvanometer will read zero when the inputs to the two rectifiers are equal. For the purpose of determining the value of the return loss the E—W currents are attenuated (by adjustment of the variable pad) until the galvanometer reads zero. The amount of attenuation which it is necessary to introduce for any particular connection in order to produce the galvanometer reading zero, is therefore a measure of the return loss or terminal balance of that connection.

If now the W subscriber talks, the voice level in path $L_2$ will be high compared to the level in the path $L_1$. As will be more fully set forth hereinbelow, this condition is the opposite of that discussed in the preceding paragraph and there would be the danger, except for the presence of the direction indicating circuit, of false measurement of return loss and also of damage to the galvanometer. The direction indicating circuit affords the necessary protection by disabling the circuit of the galvanometer G when the W—E level is substantially higher than the E—W level.

In further detail, let it be assumed that the E subscriber is talking. The waves representing his voice travel over the path $L_1$ and through the amplifier $A_1$. At the output of this amplifier the major portion of the energy passes through the receiving pad P and on to the hybrid coil H. At this point a part of the energy travels over the line L, a part is dissipated in the variable network N, and because of the imperfect balance a part is returned over the path $L_2$. In the meantime, a small portion of the energy at the output of amplifier $A_1$ passes through the bridging network and the pad $P_1$. It is to be understood that this pad $P_1$ should be removable for the purpose stated hereinbelow. From the output of pad $P_1$ the waves travel through the repeating coil $C_1$, the amplifier $A_3$, and through the weighting network $N_1$, to be discussed further hereinafter.

At the output of the network $N_1$ a small portion of the energy is impressed on the input of the E—W direction indicator amplifier $A_5$, while the main portion of the energy passes through the repeating coil $C_3$ and into the variable pad. The energy passing through amplifier $A_5$ is rectified in the rectifier $R_1$ (specifically disclosed as comprising dry disc rectifiers, such as copper oxide elements), and the resultant direct current flows through the lower winding $W_1$ of the direction indicator relay S. The current in this relay winding tends to pull the relay armature downward (with reference to the disclosure of Fig. 1).

The energy which has passed through coil $C_3$ is attenuated by the variable pad and passes through another repeating coil $C_4$ to the terminating impedance $T_1$, a part of the energy being diverted to travel through the E—W return loss indicator amplifier $A_7$. At the output of this amplifier the energy is rectified by the rectifier $R_3$, and the resultant direct current flows through the galvanometer G in a direction such that there is a tendency to deflection of the galvanometer needle in one certain direction.

The energy which is reflected back over path $L_2$ due to the unbalance through the hybrid coil H is amplified in the amplifier $A_2$. At the output of this amplifier a part of the energy travels back toward the E subscriber while a part is diverted to pass through the bridging network, the removable pad $P_2$, the repeating coil $C_2$, the amplifier $A_4$ and the weighting network $N_2$. At the output of network $N_2$ a part of the energy passes on toward the terminating impedance $T_2$ while a part passes through the direction indicator amplifier $A_6$ and is rectified in the W—E direction indicating rectifier $R_2$. The rectified output of $R_2$ flows through the upper winding $W_2$ of relay S and tends to pull the armature of the relay upward. A portion of the energy traveling toward the terminating impedance $T_2$ is diverted through the W—E return loss indicating amplifier $A_8$ and after rectification in $R_4$ is impressed on the galvanometer G. This direct current is in a direction tending to produce a deflection of the galvanometer needle in the direction opposite to that which the energy from the opposite side of the circuit tends to produce.

As has been indicated hereinabove, when the E subscriber is talking the input to the variable pad connected between repeating coils $C_3$ and $C_4$ is higher than the input to the W—E return loss indicator amplifier A8, by an amount varying in accordance with the degree of return loss. If now the variable pad is adjusted to the point at which the inputs to the two return loss indicator amplifiers, A7 and A8 are equal, the rectified outputs of R3 and R4 will be equal. Under this condition the galvanometer G will read zero since equal currents are flowing through the galvanometer in opposite directions. It will be readily understood that the setting of the variable pad which has produced this condition will give the measure of the return loss.

With particular reference to the direction indicating apparatus, when the E subscriber is talking the input to the E—W side of the direction indicator is substantially higher than the input to the W—E side, and, consequently, the current flowing in the winding W1 of relay S is greater than the current flowing in the winding W2, and the relay armature is held in the position indicated in the drawing. With this position of the armature the circuit of the galvanometer G is closed and the return loss readings may be taken.

If the W subscriber talks, the energy representing his voice and passing over line L is divided in the hybrid coil H between the two paths L2 and L1. The portion of the energy traveling over line L1 passes through the receiving pad P, and a part of this energy passes through the bridging network, pad P1, repeating coil C1, amplifier A3 and weighting network N1, and finally into the direction indicating circuit and the return loss indicating circuit in accordance with the description contained hereinabove of the operation in response to the speech of the E subscriber. The portion of the energy representing the W subscriber's voice which passes over L2 is, in part, diverted at the output of amplifier A2, the diverted portion passing through the bridging network of pad P2, repeating coil C2, amplifier A4, weighting network N2, and finally into the direction indicating circuit and the return loss indicating circuit. Under this condition of talking by the W subscriber the input to the W—E side of the direction indicator is substantially greater than the input to the E—W side. Accordingly, the current flowing in winding W2 of relay S is greater than the current flowing in winding W1, and the armature of the relay is pulled upward. The result is the breaking of the lower contact and the opening of the circuit of galvanometer G. Accordingly, the energy impressed on the return loss measuring circuit will have no effect on the galvanometer needle and protection is thus provided against a false return loss reading which might otherwise be obtained on the speech of the W subscriber.

The elements R1, R2, R3 and R4, are specifically disclosed in Fig. 1 as dry disk rectifiers. It will be understood by those skilled in the art that this type of rectifier may be replaced by other suitable rectifying elements such as vacuum tube rectifiers. However, dry disk rectifiers have the advantages over vacuum tubes that they can satisfactorily cover a somewhat wider range of energy levels, and that they are somewhat more stable.

As is indicated in Fig. 1, the pads P1 and P2 are removable; that is, they may be arranged to be included in or excluded from the branch circuits; such switching may be provided by a key control, for instance. These pads each have a value of 10 decibels. If it is desired to obtain increased sensitivity for a very weak talker these pads P1 and P2 can be removed from the branch circuits.

As appears in Fig. 1, the meter G may be shunted and its sensitivity thus reduced to take care of the case of a very loud talker. A key control is indicated on the drawing.

Fig. 2 of the drawing shows diagrammatically the arrangement of the weighting network N1, schematically disclosed in Fig. 1. The function of this network is to give satisfactory measurement of the return loss over the important echo range, which is from 600 to 1500 cycles per second. The network will take the form of a band filter designed along the general line indicated by the disclosure of Fig. 2, and includes a suitable arrangement of inductances and capacities. It will be understood that the weighting network N2 has the same function and takes the same form as the network N1.

While the measuring circuit of the applicants has been specifically disclosed as applied to one end of a four-wire circuit, it will be understood that the invention is equally applicable to a two-wire repeater.

It will be further understood that the specific disclosure contained herein is for the purpose of illustration, and that the true scope of the invention is to be determined from the appended claims.

What is claimed is:

1. In a two-way transmission system including a two-wire line and two oppositely directed paths connected therewith in approximately conjugate relation, whereby energy coming in toward the two-wire line will be in part returned over the outgoing path, the method of measuring the return loss which consists in comparing the magnitude of the energy in the incoming path and the magnitude of the returned energy in the outgoing path, and determining the degree of the return loss from the difference discovered by such comparison.

2. In a two-way transmission system including a two-wire line and two oppositely directed paths connected therewith in approximately conjugate relation, whereby energy coming in toward the two-wire line will be in part returned over the outgoing path, the method of measuring the return loss which consists in comparing the magnitude of the energy in the incoming path and the magnitude of the returned energy in the outgoing path during the useful transmission over the incoming path, and determining the degree of the return loss from the difference discovered by such comparison.

3. In a two-way transmission system including a two-wire line and two oppositely directed paths connected therewith in approximately conjugate relation, whereby energy coming in toward the two-wire line will be in part returned over the outgoing path, the method of measuring the return loss when no original energy of substantial magnitude is traveling over the outgoing path while preventing false measurement due to such original energy in the outgoing path, which consists in comparing the magnitude of the energy in the incoming path and the magnitude of the energy in the outgoing path, determining the value of the return loss from the difference discovered by such comparison, and causing the presence in the outgoing path of original energy of substantial magnitude to preclude the measurement.

4. In a two-way system for the transmission of electrical waves including a two-wire line and two oppositely directed paths connected therewith in approximately conjugate relation, whereby energy coming in toward the two-wire line will be in part returned over the outgoing path, the method of measuring the return loss which consists in diverting a portion of the energy in the incoming path, diverting a portion of the reflected energy in the outgoing path, rectifying the energy diverted from each path, comparing the strengths of the currents so produced, attenuating the energy diverted from the incoming path to produce equality of the currents resulting from rectification, and determining the value of the return loss from the degree of attenuation so effected.

5. In a two-way system for the transmission of electrical waves including a two-wire line and two oppositely directed paths connected therewith in approximately conjugate relation, whereby energy coming in toward the two-wire line will be in part returned over the outgoing path, the method of measuring the return loss which consists in diverting a portion of the energy in the incoming path, diverting a portion of the reflected energy in the outgoing path, rectifying the energy diverted from each path, comparing the strengths of the currents so produced, attenuating the energy diverted from the incoming path to produce equality of the currents resulting from rectification, determining the value of the return loss from the degree of attenuation so effected, and preventing false measurment of return loss by precluding comparison when original energy in the outgoing path is of substantial magnitude.

6. In a two-way transmission system including a two-wire line and two oppositely directed paths connected therewith in approximately conjugate relation, whereby energy coming in toward the two-wire line will be in part returned over the outgoing path, means for diverting and rectifying a portion of the energy traveling in each path and means for comparing the magnitudes of the two rectified outputs to give the measure of the return loss.

7. In a two-way transmission system including a two-wire line and two oppositely directed paths connected therewith in approximately conjugate relation, whereby energy coming in toward the two-wire line will be in part returned over the outgoing path, means for diverting and rectifying a portion of the energy traveling in each path, means for measuring the difference between the magnitudes of the two rectified outputs, and means for disabling said measuring means when original energy traveling in the outgoing path is of substantial magnitude.

8. In a two-way transmission system including a two-wire line and two oppositely directed paths connected therewith in approximately conjugate relation, whereby energy coming in toward the two-wire line will be in part returned over the outgoing path, means for applying a portion of the energy traveling in each path to give an indication of the difference of energy level between the two paths, and means for determining from the difference so discovered the degree of the return loss.

9. In a two-way transmission system including a two-wire line and two oppositely directed paths connected therewith in approximately conjugate relation, whereby energy coming in toward the two-wire line will be in part returned over the outgoing path, circuit arrangements for measuring the return loss during the useful operation of the system, comprising means for measuring the difference between the magnitude of the energy in the incoming path and the magnitude of the energy in the outgoing path and means for preventing such measurement when original energy in the outgoing path is of substantial magnitude, whereby return loss measurement is provided for while false measurement due to original energy in the outgoing path is precluded.

10. In a two-way transmission system including a two-wire line and two oppositely directed paths connected therewith in approximately conjugate relation, whereby energy coming in toward the two-wire line will be in part returned over the outgoing path, means for comparing the magnitude of the energy in the incoming path and the magnitude of the energy in the outgoing path, means associated with said comparing means for indicating the difference discovered by such comparison, and means operable when original energy in the outgoing path is of substantial magnitude for disabling said indicating means.

11. In a two-way transmission system including a two-wire line and two oppositely directed paths connected therewith in approximately conjugate relation, whereby energy coming in toward the two-wire line will be in part returned over the outgoing path, a high impedance branch from each path, rectifying means in each branch, a galvanometer connected to indicate the comparison of the outputs of the rectifying means, and a variable attenuation network in the branch from the incoming path, whereby the degree of the return loss may be determined from the amount of attenuation introduced to produce a reading of said galvanometer indicating equality of the outputs of said rectifying means.

12. In a two-way transmission system including a two-wire line and two oppositely directed paths connected therewith in approximately conjugate relation, whereby energy coming in toward the two-wire line will be in part returned over the outgoing path, a high impedance branch from each path, rectifying means in each branch, a galvanometer connected to indicate the comparison of the outputs of the rectifying means, a variable attenuation network in the branch from the incoming path, whereby the degree of the return loss may be determined from the amount of attenuation introduced to produce a reading of said galvanometer indicating equality of the outputs of said rectifying means, and means responsive to original energy of substantial magnitude in the outgoing path for disabling said galvanometer.

13. In a two-way transmission system including a two-wire line and two oppositely directed paths connected therewith in approximately conjugate relation, whereby energy coming in toward the two-wire line will be in part returned over the outgoing path, means for diverting a portion of the energy traveling in each path, means for rectifying the diverted energy, means for comparing the magnitudes of the outputs of the rectifying means to give the measure of the return loss, and means for varying the sensitivity of the rectifying means.

14. In a two-way electrical wave transmission system including a two-wire line and two oppositely directed paths connected therewith in approximately conjugate relation, whereby energy coming in toward the two-wire line will be in part returned over the outgoing path, a branch from each path for diverting a portion of the energy traveling therein, means in each branch for weighting the transmission thereover of a predetermined range of frequencies, means for rectifying the diverted energy, and means for comparing the magnitudes of the outputs of the rectifying means to give the measure of the return loss.

15. In a two-way system for the transmission of electrical waves, including a two-wire line and two oppositely directed paths connected therewith in approximately conjugate relation, whereby energy coming in toward the two-wire line will be in part returned over the outgoing path, the method of measuring the return loss which consists in comparing the magnitude of the energy in the incoming path and the magnitude of the returned energy in the outgoing path while weighting, for the purpose of such comparison, the frequencies within predetermined limits, and determining the degree of the return loss from the difference discovered by such comparison.

16. In a two-way transmission system including a two-wire line and two oppositely directed paths connected therewith in approximately conjugate relation, whereby energy coming in toward the two-wire line will be in part returned over the outgoing path, means for diverting and rectifying a portion of the energy traveling in each path, means for measuring the difference between the magnitudes of the two rectified outputs, and means for disabling said measuring means when original energy of substantial magnitude is traveling in said outgoing path, said disabling means being adapted to respond to such original energy in the outgoing path independently of the presence or absence of energy in the incoming path.

LEONARD G. ABRAHAM.
DOREN MITCHELL.
RUSSELL S. HAWKINS.